C. Oyston,
Nozzle,
No. 53,175.      Patented Mar. 13, 1866.
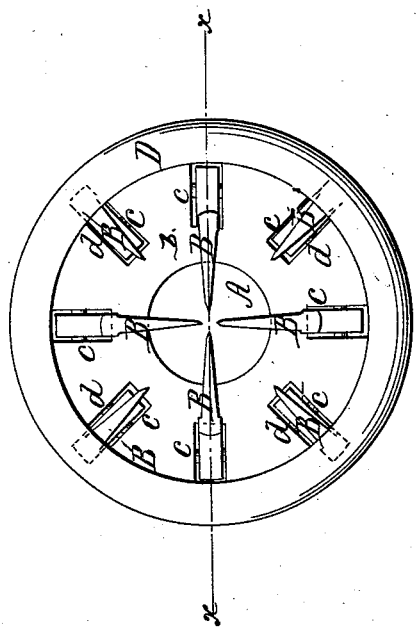
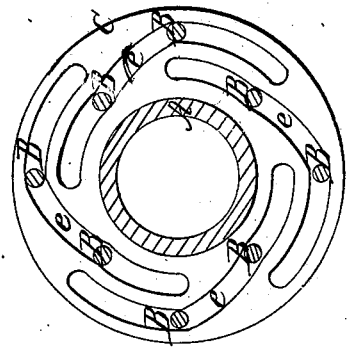
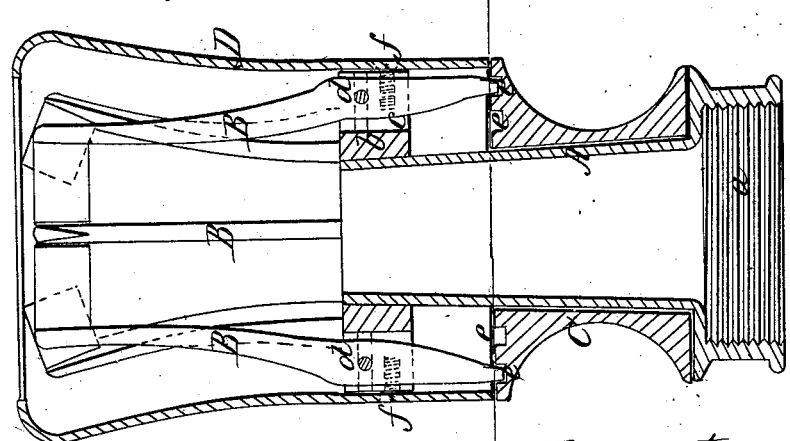
Witnesses      Inventor
Chas Oyston
Per Munn & Co
Attys

UNITED STATES PATENT OFFICE.

CHARLES OYSTON, OF LITTLE FALLS, NEW YORK.

IMPROVEMENT IN NOZZLES FOR FIRE-ENGINES.

Specification forming part of Letters Patent No. 53,175, dated March 13, 1866.

*To all whom it may concern:*

Be it known that I, CHARLES OYSTON, of Little Falls, in the county of Herkimer and State of New York, have invented a new and Improved Nozzle for Fire-Engines; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention, the line $x\ x$, Fig. 2, indicating the plane of section. Fig. 2 is an end view of the same. Fig. 3 is a horizontal section of the same, the line $y\ y$, Fig. 1, indicating the plane of section.

Similar letters of reference indicate like parts.

This invention relates to an improvement on that class of nozzles for fire-engines on which a patent was granted to me August 25, 1863, and which are constructed with a series of wedged-shaped divergers, whereby the stream of water issuing from the nozzle can be divided up or spread at the pleasure of the operator.

The improvement which composes the subject-matter of this present invention consists in combining with the spreaders and nozzle a revolving sleeve with cam-slots of such a form or shape that the spreaders are opened and closed at different periods of time, first one portion and then another, and by these means different results can be produced at the will of the operator.

It consists, also, in protecting the spreaders by a jacket secured to the outer end of the nozzle in such a manner that injury to said spreaders from carelessness or accident is avoided.

A represents a nozzle for a fire-engine, which is constructed in the usual form or shape, and which is provided with a suitable screw-thread, $a$, on its inner end, by which it can be secured to a hose or pipe connecting with the engine. Secured to the outer end of the nozzle A is a collar, $b$, which is provided with a series of radial slots, $c$, to receive the spreaders B. Each of these spreaders has its fulcrum on a pivot, $d$, secured in the collar $b$, and their upper wedge-shaped ends extend beyond the mouth of the nozzle, as clearly shown in Fig. 1 of the drawings.

The inner ends of the spreaders are rounded off, and arranged so that they catch in cam-grooves $e$ in the outer surface of a sleeve, C, which is fitted on the nozzle A below the ring $b$. The shape of these cam-grooves is shown in Fig. 3 of the drawings. It is such that when the sleeve is turned on the nozzle by their action the spreaders are caused to close up or to open at different periods of time, first one portion and then another, and thereby the operator is enabled to spread the stream emenating from the nozzle more or less, as he may desire.

In the drawings eight spreaders are shown, and by turning the sleeve four of these close or open first, and then the others; but it is obvious that the shape of the cam-grooves might be changed so as to close two or more spreaders at a time, and instead of having eight spreaders a larger or smaller number might be used.

Instead of the cam-slots and sleeves other devices might be used to produce the "periodical" movement of the spreaders; and I do not wish to confine myself to the precise mechanism shown in the drawings.

A jacket, D, which is secured to the circumference of the collar $b$ surrounds the spreaders and protects the same against injury. This jacket must be of such a diameter that it does not interfere with the motion of the spreaders. This jacket may be cast or otherwise produced of brass or iron or any other suitable material, and it is secured to the collar by screws or any other suitable means.

What I claim as new, and desire to secure by Letters Patent, is—

1. Giving the spreaders what I term a "periodical" movement by means substantially such as herein described, or any other equivalent means, for the purpose set forth.

2. The combination of the jacket D with the spreaders B and nozzle A, substantially as and for the purpose described.

CHARLES OYSTON.

Witnesses:
LOTAN P. KNAPP,
JAMES M. SMITH.